June 10, 1952  A. FRIEDMAN ET AL  2,599,821
MULTISTEP PULLEY
Original Filed Jan. 24, 1946
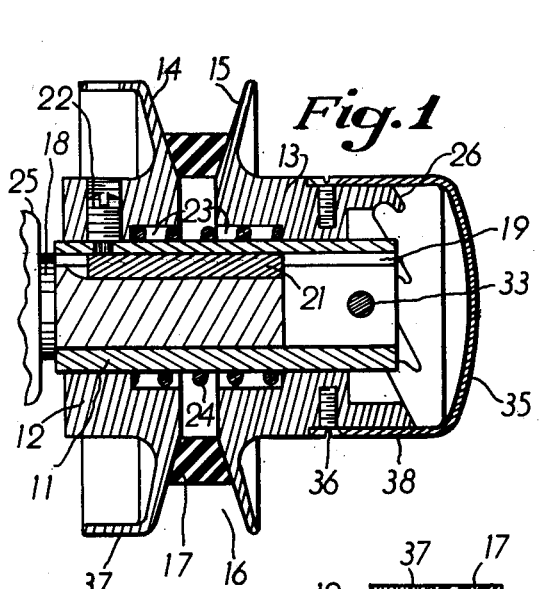
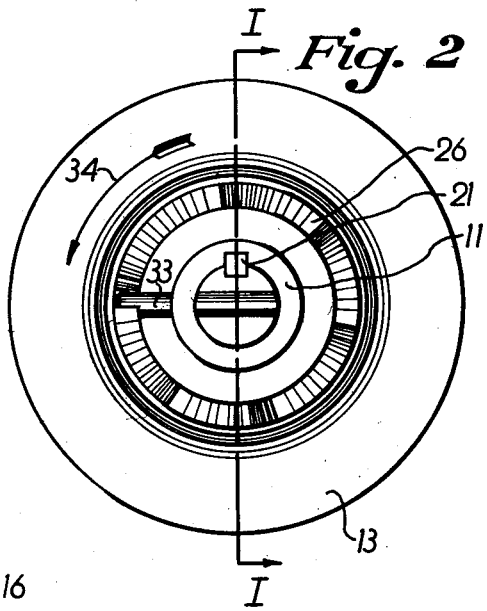
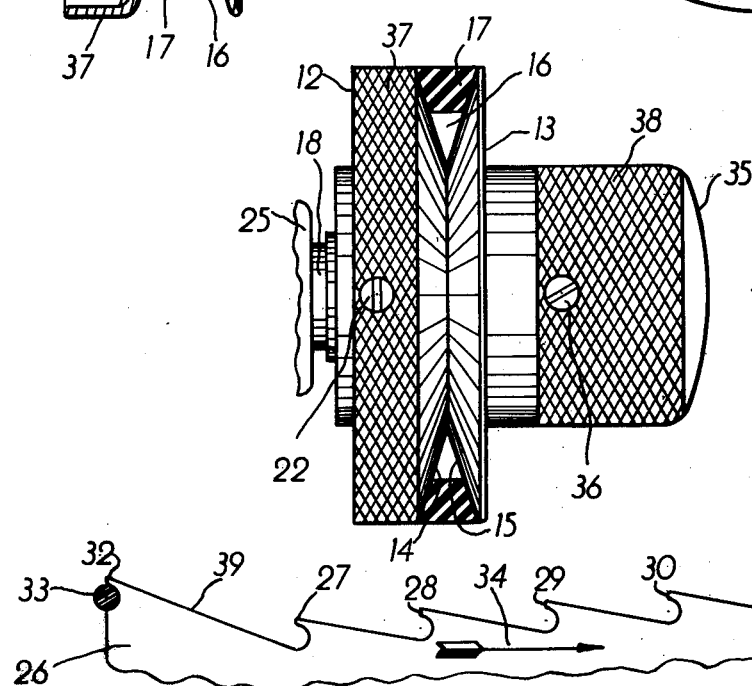
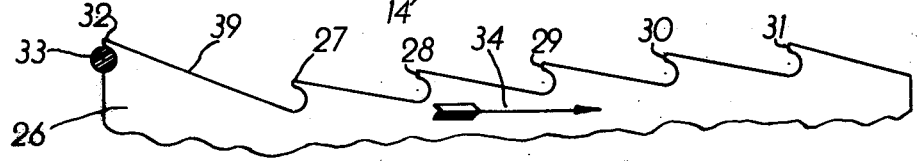
Arthur Friedman, INVENTORS.
Louis Silber
BY
Atty Patented June 10, 1952

2,599,821

UNITED STATES PATENT OFFICE 2,599,821

MULTISTEP PULLEY

Arthur Friedman, Cleveland, Ohio, and Louis Silber, deceased, late of Cleveland, Ohio, by Ruben Silber, administrator, Cleveland, Ohio, assignors to Air Controls, Inc., Cleveland, Ohio, a corporation of Ohio Substituted for abandoned application Serial No. 643,067, January 24, 1946. This application November 28, 1951, Serial No. 258,592

7 Claims. (Cl. 74—230.17)

This application is a substitute for application Serial No. 643,067, filed January 24, 1946, now abandoned.

Our invention relates to pulleys for variable speed drives.

An object of our invention is to provide an improved, simply constructed, rugged pulley for V-belts which is adjustable in effective diameter.

A further object of the invention is to render such an adjustable pulley self-locking and to provide quick, easy adjustment of effective pulley diameter.

Still another object of the invention is to provide a multi-step ratchet type of pulley.

Other and further objects, features and advantages of the invention will become apparent as the description proceeds.

In carrying out the invention in accordance with a preferred form thereof, we provide a pulley with two relatively rotatable parts, each carrying one of the two conical-surface flanges between which a V-belt is intended to ride during operation of the pulley. One of the pulley parts is secured to a drive shaft or driven shaft and the other part has a loose fit on the shaft. One of the parts, preferably the relatively movable part, is formed with an annular ratchet, which has axial "lift" progressively changing around the periphery of the ratchet; and the other part carries a drive pin adapted to cooperate with the ratchet for limiting the space between the flanges of two pulley parts. Suitable resilient means such as a compression spring is provided for holding the pulley parts as far apart as permitted by the engagement between the drive pin and the ratchet. Relative rotation of the two pulley parts, with the drive pin riding over the teeth of the ratchet, serves to adjust the relative axial position of the pulley parts, and therefore, the effective pulley diameter.

A better understanding of the invention will be effected by the following detailed description considered in conjunction with the accompanying drawing in which:

Fig. 1 is a view of a section represented as cut by a plane passing through the axis of a pulley forming an embodiment of our invention;

Fig. 2 is an end view of the apparatus of Fig. 1 with an end cover removed;

Fig. 3 is an outside view of the pulley of Fig. 1 in the fully closed or high speed position; and Fig. 4 is a developed view of the circumference of the ratchet portion of the movable pulley part.

Like reference characters are utilized throughout the drawing to designate like parts.

The form of multi-step ratchet pulley shown in the drawing by way of illustration, comprises a hub 11 carrying a fixed pulley part 12 secured to the hub 11 and a relatively removable pulley part 13, loosely mounted on the hub 11. The pulley parts 12 and 13 include frusto-conical surface portions or flanges 14 and 15, respectively, forming a tapered or V-shaped sheave or groove 16 for receiving a V-belt 17 of conventional form. The pulley part 13 is adapted to be moved back and forth axially so as to increase or decrease the width of the belt groove 16 whereby the effective diameter of the pulley is varied.

The hub 11 is adapted to be secured to a shaft 18 in any suitable manner as by means of a keyway 19 and a key or feather 21. The shaft 18 carrying the pulley, may be either a drive shaft or a driven shaft. For the sake of illustration, the shaft 18 is assumed to be the drive shaft for the variable speed drive, for example, a shaft of an electric motor 25, represented fragmentarily.

The pulley part 12, is secured to the hub 11, in any suitable manner as by means of a set screw 22. The pulley part 13 makes a loose fit on the hub 11 and is provided with means for resiliently spreading the pulley flanges 14 and 15. Preferably, the pulley parts 12 and 13 are undercut to form counterbores 23 receiving a compression spring 24 surrounding the central portion of the hub 11.

The outer end of the pulley part 13, that is the end away from the drive motor 25 has an annular ratchet 26 formed therein. The ratchet 26 is formed with a plurality of teeth, preferably relatively evenly spaced around the periphery thereof; but, with progressively greater lift measured axially as one progresses around the periphery of the ratchet 26. For example, where six different speed adjustments are desired, the ratchet 26 is provided with six teeth, 27, 28, 29, 30, 31 and 32. As illustrated in the developed view, Fig. 4, the tooth 27 has the smallest lift or is the closest to the motor end of the pulley part 13, and the lifts of the teeth 28, 29, 30, 31 and 32 become progressively greater. To cooperate with the ratchet 26 and to limit the extent to which the pulley parts 12 and 13 are spread by the compression spring 24, a drive pin 33 is provided which is suitably secured to the rigid part of the pulley. For example, in the arrangement illustrated, it passes through diametrically arranged openings in the hub 11, Preferably the ratchet teeth 27 to 32 are slightly hook-shaped so that a slight reverse rotation of the pin 33 is required to release it from one of the ratchet teeth.

It is assumed that the motor 25 is designed to drive the motor shaft 18 in a counter-clockwise direction (as viewed in Fig. 2) accordingly, the ratchet teeth 27 to 32, inclusive, are arranged to point in the opposite direction, namely, the clockwise direction. Thereby the drive pin 33 serves not only to limit the relative axial movement of the pulley parts 12 and 13; but, also renders the pulley adjustment self-locking. The counter-clockwise direction of the drive or the motor rotation is represented by the arrow 34 in Figs. 2 and 4. Since the ratchet teeth 26 are formed in the pulley part 13 and the pin 33 is secured to the pulley part 12, the ratchet and pin normally rotate with the pulley to form a self-contained pulley unit. This feature also enables the pulley adjustment to be self-locking and not to depend upon external control.

Preferably as a protection to the ratchet and to operators and to improve the appearance of the pulley, a removable end cap 35 is provided to cover the ratchet 26 and is secured to the pulley part 13 in any suitable manner as by means of screws 36.

The adjustment of the effective pulley diameter is accomplished by grasping the pulley parts 12 and 13 and rotating the part 13 counter-clockwise relative to the part 12. To facilitate this operation, the part 12 is preferably provided with a knurled surface 37 and the end cap 35 is provided with a knurled surface 38. As the ratchet teeth 31, 30, 29 and so on are caused to pass successively under the drive pin 33, the opening between the flanges 14 and 15 is permitted to become greater and greater, so that the effective pulley diameter decreases since the belt 17 is permitted to drop further into the belt groove 16. However, after the last tooth 27 has been reached, continued relative rotation of the pulley parts 12 and 13 forces the pulley parts together again as the pin 33 rides along the return lift portion 39 of the ratchet 26. The ratchet teeth 27 to 32 are preferably evenly spaced; but, preferably a greater space is provided between the ratchet teeth 27 and 32.

When the motor 25 is started, the pulley locks itself in any adjustment in which it has been set because the drive pin 33 hooks into one of the ratchet teeth and further relative rotation of the pulley parts is prevented.

While the invention has been described as embodied in concrete form and as operating in a specific manner in accordance with the provisions of the patent statutes, it should be understood that the invention is not limited thereto, since various modifications will suggest themselves to those skilled in the art without departing from the spirit of the invention, the scope of which is set forth in the annexed claims.

What we claim is:

1. An adjustable pulley comprising in combination a drive shaft, a hub secured thereto, first and second pulley parts having confronting frusto-conical surfaces to form a sheave, the first pulley part being secured to said hub, a compression spring for resiliently separating said pulley parts axially to widen the sheave, a radially extending drive pin secured to said hub and an annular ratchet formed in said second pulley part adapted to engage said drive pin and having an axial lift increasing along the periphery thereof, whereby the width of the sheave and effective diameter may be adjusted by relative rotation of said drive pin and said ratchet, said drive shaft being adapted to rotate in a given direction and said ratchet having teeth pointing in the opposite direction, whereby the adjustment is rendered self-locking when said drive shaft rotates in said given direction.

2. An adjustable pulley comprising in combination a hub, a pulley part secured thereto, a second pulley part movably mounted on the said hub, said pulley parts having confronting frusto-conical surfaces to form a sheave for a V-belt, a compression spring for resiliently separating the said pulley parts, a pin extending radially from said hub, said second pulley part having an annular ratchet formed to engage said pin, said ratchet having an axial lift increasing along the periphery of said ratchet for enabling the width of the sheave and effective pulley diameter to be varied by relatively rotating said hub and said movable pulley part.

3. An adjustable pulley comprising in combination a pair of relatively movable pulley parts having confronting frusto-conical surfaces to form a sheave for a V-belt, one of said pulley parts having an annular ratchet formed therein with successive teeth axially displaced with respect to each other, a pin secured to the other of said pulley parts and extending transversely to engage said ratchet, and a spring for exerting an axial force between said pulley parts to hold said pin against said ratchet, whereby the width of the sheave and the effective pulley diameter may be varied by relative rotation of said pulley parts.

4. An adjustable pulley comprising in combination a pair of parts having confronting substantially frusto-conical surfaces to form a sheave for a V-belt, an annular ratchet secured to one of said parts, and a drive pin to engage said ratchet secured to the other of said parts with means for resiliently biasing said pulley parts to cause the pin to bear against the ratchet, whereby the width of said sheave and the effective pulley diameter may be adjusted by relative rotation of said pulley parts, and both ratchet and drive pin normally rotate with the pulley to form a self-contained pulley unit.

5. An adjustable pulley comprising in combination a pair of pulley parts having confronting frusto-conical surfaces to form a sheave for a V-belt, a hub to which one of said parts is secured, the other being slidable on said hub, an annular ratchet secured to one of said parts with successive teeth axially displaced from one another, means secured to the other of said pulley parts for engaging said ratchet teeth when one pulley part tends to drive the other, and means for holding the engaging means against said ratchet, for locking the said pulley parts to rotate together on said hub, whereby the width of the sheave and the effective pulley diameter are determined by the relative angular position of said pulley parts, and both the ratchet and ratchet-engaging means normally rotate with the pulley to form a self-contained pulley unit.

6. An adjustable pulley comprising a pair of pulley parts having confronting frusto-conical surfaces to form a sheave for a V-belt, a hub to which one of said parts is secured, the other being slidable on said hub, one of said pulley parts being driven when the pulley rotates in a predetermined direction, an annular ratchet secured to one of said parts with successive teeth partially hooked and axially displaced from one another, means secured to the other of said pulley parts for engaging said ratchet teeth in opposition to the direction in which said teeth are hooked when one pulley part tends to drive the other for locking the two pulley parts to rotate together on said hub whereby the width of the pulley sheave and the effective pulley diameter are determined by the relative angular positions of said pulley parts, and both the ratchet and ratchet-engaging means normally rotate with the pulley to form a self-contained pulley unit.

7. An adjustable pulley comprising in combination a pair of pulley parts having confronting frusto-conical surfaces to form a sheave for a V-belt, a hub to which one of said parts is secured, the other being slidable on said hub, means secured to one of said parts with angularly spaced teeth successively displaced axially from one another, and means secured to the other of said pulley parts for engaging said teeth when one pulley part tends to drive the other for locking the two pulley parts to rotate together on said hub, whereby the width of the pulley sheave and effective pulley diameter are determined by the relative angular positions of said pulley parts, and both teeth and tooth-engaging means normally rotate with the pulley to form a self-contained pulley unit.

ARTHUR FRIEDMAN.
RUBEN SILBER,
*Administrator of the Estate of Louis Silber, Deceased.*

REFERENCES CITED

The following references are of record in the file of this patent:

UNITED STATES PATENTS

| Number | Name | Date |
|---|---|---|
| 423,266 | McGuire | Mar. 11, 1890 |
| 487,721 | DeKalb | Dec. 13, 1892 |
| 939,427 | Main | Dec. 13, 1892 |
| 2,092,469 | Oslund | Sept. 7, 1937 |

FOREIGN PATENTS

| Number | Country | Date |
|---|---|---|
| 3,440 | Great Britain | 1909 |
| 23,292 | Great Britain | 1911 |